United States Patent Office
3,733,298
Patented May 15, 1973

3,733,298
METHOD FOR PREPARING POLYCARBORANYL-ENESILOXANE POLYMERS
Karl O. Knollmueller, Hamden, Conn., assignor to Olin Corporation
No Drawing. Filed Apr. 28, 1972, Ser. No. 248,589
Int. Cl. C08f 11/04
U.S. Cl. 260—46.5 E                          9 Claims

ABSTRACT OF THE DISCLOSURE

Method for the preparation of linear polycarboranylenesiloxane polymers by the condensation of selected hydroxy terminated, silicon-containing carboranes with selected anilinosilanes.

---

This invention herein described was made in the course of or under a contract or subcontract thereunder, with the Department of the Navy.

This invention relates to an improved method for the preparation of linear polycarboranylenesiloxane polymers and more particularly involves the condensation of selected hydroxy terminated, silicon-containing carboranes with selected anilinosilanes.

Several methods for preparing polycarboranylenesiloxane polymers are known in the art. High temperature, ferric chloride catalyzed, copolymerization of an alkoxy substituted neocarborane with a halogen containing silane, siloxane or silyl carborane is shown in U.S. Pats. 3,388,090 to 3,388,093 inclusive. The hydrolytic condensation of silicon-containing carboranes is disclosed in U.S. Pat. 3,637,589. Additionally polymers have been prepared by condensation methods using various catalysts as disclosed in U.S. Pat. 3,457,222.

The above-noted methods can satisfactorily produce carboranylenesiloxane polymers; however, the capability of producing a wide variety of high molecular weight linear polymers by each method is somewhat limited. Additionally heretofore, condensation reactions in the presence of free bases, including organic ones, could not be performed using carboranylenesiloxane monomers because cleavage of the silicon-carborane bond occurred.

Now it has been found that linear high molecular weight carboranylenesiloxane polymers can be conveniently and economically prepared by the direct one-step method of this invention. More particularly this invention relates to the condensation of selected silicon-containing carboranes with selected anilinosilanes wherein free aniline is removed with the formation of the desired polymers. These carboranylenesiloxane polymers formed have recurring units of the formula below:

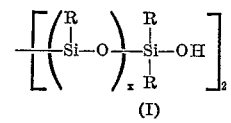

wherein A represents the carborane radical —CB$_{10}$H$_{10}$C— or —CB$_5$H$_5$C—; each R is an independently selected alkyl group of 1 to 8 carbon atoms, aryl group of 6 to 10 carbon atoms, or the substituted fluoro and cyano derivatives of such groups and $n$ represents a number of repeating units whose value will depend on particular starting material used. It is further noted that henceforth in the specification and claims, the radical —CB$_{10}$H$_{10}$C— is utilized to represent both of the well-known m- and p-carborane cage structures as shown for example in U.S. Pat. 3,397,221.

The method of this invention is particularly advantageous because a broad range of starting monomers, including those having a variety of substituents attached to the siloxanyl groups, may be utilized thus making it possible to prepare carboranylenesiloxane polymers having a wide range of physical and chemical properties and also generally having high molecular weights of up to about 200,000 or more. These desirable properties allow the polymers prepared by this method to have utility in various applications including for example use as high temperature liquids and coatings, gaskets, o-rings, encapsulation materials, heat resistant adhesives and in liquid partitioning phases used in vapor phase chromatography. Additionally these polymers can be cured at room temperature with tetrafunctional silanes and metal soap catalysts to give elastomers with outstanding thermal properties.

More particularly, this invention relates to the condensation of selected silicon-containing carboranes with selected anilinosilanes with the removal of aniline to form the desired polymers as shown by the following equation wherein for example bis(1,1,3,3-tetramethyl-3-hydroxydisiloxanyl)-carborane is reacted with dimethyl dianilinosilane:

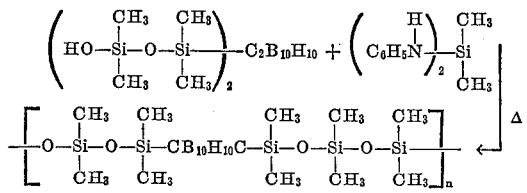

where $n$ represents a number of repeating units.

This reaction was somewhat surprising in view of the fact that previous condensation reactions in the presence of free bases could not be performed since cleavage of the siliconcarborane bonds occurred.

The hydroxy terminated, silicon-containing carboranes which are suitable for use as starting materials in the method of this invention are shown by the following formula:

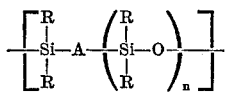

(I)

wherein A represents the carborane radical —CB$_{10}$H$_{10}$C— or —CB$_5$H$_5$C—; each R is an independently selected alkyl group of 1 to 8 carbon atoms, preferably 1 to 4, aryl group of 6 to 10 carbon atoms, preferably phenyl, or a fluoro or cyano derivative of said alkyl and aryl groups and preferably trifluoropropyl, fluorophenyl and cyanoethyl; and $x$ is from 0 to 2. Thus, for example, each R substituent may be methyl, ethyl, butyl, octyl, phenyl, tolyl, xylyl, naphthyl, trifluoropropyl, fluorophenyl or cyanoethyl. Other substituents may be included on the R groups if desired.

Basically, these hydroxy terminated, silicon-containing carboranes (I) may be prepared by the hydrolysis of the corresponding bis[haloalkyl (or aryl) silyl] carborane as disclosed in U.S. Pat. 3,457,222. Illustrative of the above-described hydroxy terminated, silicon-containing carborane starting materials are the following compounds:

bis(dimethyldroxylsilyl)carborane
bis(diethylhydroxysilyl)carborane
bis(methylphenylhydroxysilyl)carborane
bis[methyl-(3,3,3-trifluoropropyl)hydroxysilyl] carborane
bis[1,3-dimethyl-1,3-di-(3,3,3-trifluoropropyl)-3-hydroxydisiloxanyl]carborane
bis(1,1,3,3-tetramethyl-3-hydroxydisiloxanyl)carborane
bis(1,1,3-trimethyl-3-phenyl-3-hydroxydisiloxanyl)carborane bis[1,1,3-trimethyl-3-(3,3,3-trifluoropropyl)-3-hydroxy-disiloxanyl]carborane bis[1,1,3-trimethyl-3-fluorophenyl-3-hydroxydisiloxanyl]carborane bis[1,1,3-trimethyl-3-cyanoethyl-3-hydroxydisiloxanyl]carborane bis(1,1,3,3,5,5-hexamethyl-5-hydroxytrisiloxanyl)carborane bis(1,1,3,3-tetramethyl-5,5-diethyl-5-hydroxytrisiloxanyl)carborane bis(1,1,3,3-tetramethyl-5,5-diphenyl-5-hydroxytrisiloxanyl)carborane In addition to the above-noted carborane monomer materials (I), low molecular weight condensation polymers or oligomers of said materials may be used as starting materials. Additionally, copolymers of organosiloxanes, such as (I), with dihalosilanes or dihalosiloxanes prepared by condensation methods such as disclosed in U.S. Pat. No. 3,637,589 may also be used as starting materials. Generally, the average molecular weight of such polymers or copolymers will vary up to about 10,000 and may even be as high as about 20,000 or higher.

The anilinosilane starting materials which may be used in the method of this invention will generally have the following formula:

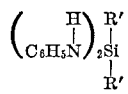

wherein such R' is an independently selected alkyl group of 1 to 8 carbon atoms, preferably 1 to 4, an aryl group of 6 to 10 carbon atoms, preferably phenyl or a fluoro or cyano derivative of said alkyl and aryl groups and preferably trifluoropropyl, fluorophenyl and cyanoethyl. Thus, for example each R' substituent may be methyl, ethyl, butyl, octyl, phenyl, tolyl, xylyl, naphthyl, trifluoropropyl, fluorophenyl or cyanoethyl.

The above-noted anilinosilane material may be prepared by reacting dihalodialkyl (or aryl) silanes with excess aniline in a manner as disclosed in an article by H. H. Anderson entitled, "Methyl Anilinosilanes and Ethyl Anilinosilane; Reactions of Anilinosilanes" in J. Am. Chem. Soc., vol. 73, pp. 5802-3 (1951).

Illustrative of the above-described anilinosilane starting materials are the following compounds: dimethyl dianilinosilane, diphenyl dianilinosilane, methyl-phenyl dianilinosilane, methyl-trifluoropropyl dianilinosilane and methyl-cyanoethyl dianilinosilane.

The condensation reaction of this invention may be carried out over a wide temperature range and more particularly may vary from about 100 to about 250° C. with 150 to 200° C. being preferred. The pressure at which the reaction is run may also be varied over a wide range with atmospheric to subatmospheric pressures being preferred.

The amounts of anilinosilane and silicon-containing carborane used my vary widely with a stoichiometric or equimolar ratio being most preferred.

The method of this invention is further illustrated by the following examples.

EXAMPLE I

Into a flask equipped with a distilling head were introduced (under dry N) 8.80 g. of bis(1,1,3,3-tetramethyl-3-hydroxydisiloxanyl) carborane (0.02 moles) and 4.84 g. dimethyl dianilinosilane. The contents were heated under vacuum (to ease the aniline elimination) for four hours at 190° C. and overnight at 160° C. Aniline was collected in a trap connected to the condenser, cooled with acetone/CO₂. The residue product was dissolved in 50 ml. ether, washed two times with 20 ml. water, dried over anhydrous magnesium sulfate and filtered. The product was then precipitated from the concentrated ether solution with an excess of methanol. The methanol rich upper layer was decanted and the product freed from solvents by pumping at 60° C. The resulting product yield was 8 g., had a gel permeation chromatogram (GPC) peak maximum molecular weight of 16,500 and a structure, verified by nuclear magnetic resonance (NMR), of recurring units of the formula:

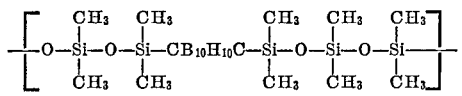

EXAMPLE II

The same general procedure as in Example I was followed using 15.18 g. (0.052 mole) of bis(dimethylhydroxysilyl)carborane and 12.58 g. (0.052 mole) of dimethyl dianilinosilane. After workup, the polymer was isolated as a solid in 93 percent yield with a melting point of 81-83° C. The GPC peak maximum molecular weight was 16,500 and the structure was verified by NMR to have recurring units of the formula:

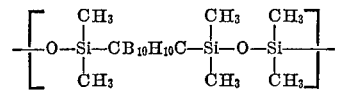

EXAMPLE III

The same general procedure as in Example I was followed using 5.01 g. (0.0172 mole) of bis(dimethylhydroxysilyl)carborane and 6.29 g. (0.0172 mole) of diphenyl dianilinosilane. After the theoretical quantity of aniline was liberated, the resulting product was dissolved in ether solution and precipitated with methanol whereby about 0.3 g. of a by-product was precipitated. The methanol solution was concentrated, taken up in ether, washed with water and dried over anhydrous magnesium sulfate. To this slurry was added active carbon to remove discoloration. After filtration and evaporation of solvents in vacuo, 5.6 g. of a viscous product resulted having a GPC peak maximum molecular weight of 1028 and a structure confirmed by NMR having recurring units of the formula:

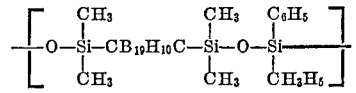

EXAMPLE IV

The same general procedure as in Example I was followed using 25.52 g. (0.0624 mole) of bis(1,1,3,3-tetramethyl-3-hydroxy disiloxanyl) carborane and 19.0 g. (0.0624 mole) of methyl-phenyl dianilinosilane. The resulting product was obtained in 83 percent yield with a GPC peak molecular weight of 16,000 and a structure confirmed by NMR analysis to have recurring units of the formula:

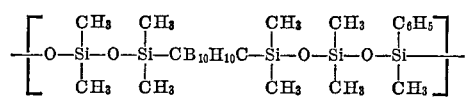

EXAMPLE V

The same general procedure as in Example I was followed using 20.25 g. (0.0692 mole) of bis(dimethylhydroxysilyl)carborane and 22.45 g. of methyl-3,3,3-trifluoropropyl dianilinosilane. The resulting product yield was 15.7 g. and had a GPC peak maximum molecular weight of 8100.

*Analysis*—Calculated for $C_{10}H_{29}B_{10}O_2F_3Si_3$ (percent): C, 27.89; H, 6.78; B, 25.10; F, 13.23; Si, 19.57. Found (percent): C, 28.02; H, 6.82; B, 24.98; F, 13.21; Si, 19.45.

The product structure was confirmed by NMR analysis to have recurring units of the following formula:

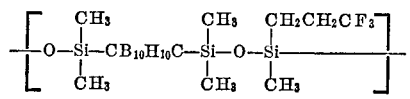

EXAMPLE VI

The same general procedure as in Example I was followed using 25 g. (0.06 mole) of bis(methylphenylhydroxysilyl)carborane and 14.54 g. (0.06 mole) of dimethyl dianilinosilane. The resulting product yield was 24.7 g. and had a GPC peak maximum molecular weight of 9000.

*Analysis*—Calculated for $C_{18}H_{32}B_{10}O_2Si_3$ (percent): C, 45.73; H, 6.82; B, 22.86; Si, 17.82. Found (percent): C, 45.66; H, 6.87; B, 22.78; Si, 17.90.

The product structure was confirmed by NMR analysis to have recurring units of the following formula:

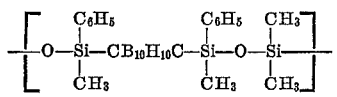

EXAMPLE VII

The same general procedure as in Example I was followed using 28.14 g. (0.0675 mole) of bis(methylphenylhydroxysilyl)carborane and 21.91 g. (0.0675 mole) of methyl-3,3,3-trifluoropropyl dianilinosilane. The resulting product was obtained in an amount of 29.7 g. and had a GPC peak maximum molecular weight of 8000.

*Analysis*—Calculated for $C_{20}H_{33}B_{10}F_3O_2Si_3$ (percent): C, 43.30; H, 5.99; B, 19.48; F, 10.27; Si, 15.19. Found (percent): C, 43.40; H, 6.03; B, 19.37; F, 10.20; Si, 15.24.

The product structure was confirmed by NMR analysis to have recurring units of the following formula:

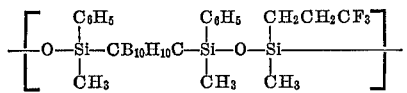

EXAMPLE VIII

The same general procedure as in Example I was followed using 29.25 g. (0.1 mole) of bis(dimethylhydroxysilyl)carborane and 27.7 g. (0.1 mole) of methyl-cyanoethyl dianilinosilane. After the theoretical quantity of aniline was liberated, the resulting product was dissolved in a mixture of ether (80% vol.) and acetone (20% vol.) and extracted with water. The solution was dried over anhydrous magnesium sulfate and precipitation performed with the gradual addition of petroleum ether. Three fractions were obtained having molecular weights determined by GPC of 5200, 3400 and 1700 respectively. The results indicated the polymer formed had a structure having recurring units of the following formula:

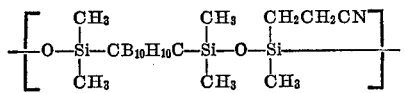

What is claimed is:
1. The method for preparing polycarboranylenesiloxane polymers comprising condensing a compound of the formula:

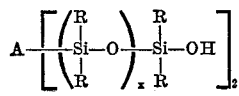

wherein A represents the carborane radical selected from the group consisting of —$CB_{10}H_{10}C$— and —$CB_5H_5C$—; each R is independtly selected from the group consisting of alkyl of 1 to 8 carbon atoms, aryl of 6 to 10 carbon atoms and the fluoro and cyano derivatives of said alkyl and aryl groups; and x is 0 to 2 with an anilinosilane material of the formula:

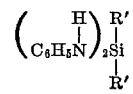

wherein each R' is independently selected from the group consisting of alkyl of 1 to 8 carbon atoms, aryl of 6 to 10 carbon atoms, and the fluoro and cyano derivatives of said alkyl and aryl groups said condensation being carried out at a temperature of from about 100 to about 250° C.

2. The method of claim 1 wherein the condensation is performed at a pressure from about atmospheric to subatmospheric.

3. The method of claim 2 wherein each R and R' is independently selected from the group consisting of alkyl of 1 to 4 carbon atoms, phenyl, trifluoropropyl, fluorophenyl and cyanoethyl.

4. The method of claim 3 wherein said compound is selected from the group consisting of bis(dimethylhydroxysilyl)carborane, bis(1,1,3,3 - tetramethyl-3-hydroxydisiloxanyl)carborane and bis(methylphenylhydroxysilyl) carborane.

5. The method of claim 4 wherein said anilinosilane material is selected from the group consisting of dimethyl dianilinosilane, methyl-phenyl dianilinosilane, diphenyl dianilinosilane, methyl - 3,3,3 - trifluoropropyl dianilinosilane and methyl-cyanoethyl dianilinosilane.

6. The method of claim 5 wherein A represents the carborane radical —$CB_{10}H_{10}C$—.

7. The method of claim 6 wherein said temperature is from about 150 to about 200° C.

8. The method of claim 7 wherein said compound is bis(1,1,3,3 - tetramethyl-3-hydroxydisiloxanyl)carborane and said anilinosilane material is dimethyl dianilinosilane.

9. The method of claim 7 wherein said compound is bis(dimethylhydroxysilyl)carborane and said anilinosilane material is dimethyl dianilinosilane.

References Cited
UNITED STATES PATENTS

| | | | |
|---|---|---|---|
| 3,457,222 | 7/1969 | Papetti | 260—46.5 |
| 3,354,193 | 11/1967 | Fein et al. | 260—448.2 |

DONALD E. CZAJA, Primary Examiner

M. I. MARQUIS, Assistant Examiner

U.S. Cl. X.R.

117—161 ZA; 260—18 S, 46.5 G, 448.2 N